United States Patent [19]

Boucher

[11] Patent Number: 5,623,041

[45] Date of Patent: Apr. 22, 1997

[54] POLYMERS USEFUL AS PRINTING VEHICLES

[75] Inventor: Steven P. Boucher, Hatfield, Pa.

[73] Assignee: Henkel Corporation, Plymouth Meeting, Pa.

[21] Appl. No.: 406,280

[22] Filed: Mar. 17, 1995

Related U.S. Application Data

[63] Continuation-in-part of Ser. No. 359,247, Jan. 16, 1994, abandoned, which is a continuation of Ser. No. 167,264, Dec. 14, 1993, abandoned, which is a continuation-in-part of Ser. No. 87,823, Jul. 1, 1993, abandoned.

[51] Int. Cl.$^6$ ................................................ C08F 220/18
[52] U.S. Cl. ................................ 526/329.2; 526/318.44
[58] Field of Search ........................... 526/329.2, 318.44, 526/318.41; 524/458, 460

[56] References Cited

U.S. PATENT DOCUMENTS

| | | | |
|---|---|---|---|
| 4,148,779 | 4/1979 | Blackwell et al. | 260/40 |
| 4,230,613 | 10/1980 | Wolinski et al. | 156/315 |
| 4,370,460 | 1/1983 | Neubert et al. | 526/329.2 |
| 4,814,373 | 3/1989 | Frankel et al. | 524/460 |
| 4,921,899 | 5/1990 | Phan et al. | 524/513 |
| 5,075,364 | 12/1991 | Phan et al. | 524/190 |
| 5,196,470 | 3/1993 | Anderson et al. | 524/379 |

*Primary Examiner*—Jeffrey T. Smith
*Attorney, Agent, or Firm*—Wayne C. Jaeschke; John D. Wood; Daniel S. Ortiz

[57] ABSTRACT

Provided are polymers having the formula:

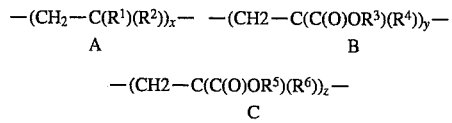

wherein $R^1$ is an aromatic group having from 6 to 10 carbon atoms, $R^3$ is a fatty alkyl group having from 12 to 22 carbon atoms, and $R^5$ is a hardening alkyl group having from 1 to 4 carbon atoms, $R^2$, $R^4$, and $R^6$ are each independently hydrogen or methyl, and y, is chosen in relation to x and z such that a film of said polymer has improved alkali resistance. Also provided is a method of coating a substrate comprising (i) contacting a surface of a substrate with an aqueous dispersion composition comprising a polymer as defined above, and (ii) drying said surface to form a film of said polymer in contact with said surface. In preferred methods, said polymer in aqueous dispersion is supplied to said surface by a hydrophilic cylindrical transfer roll. These polymers are particularly useful as the binder for an ink composition, or an overprint varnish, having good alkali resistance.

27 Claims, No Drawings

POLYMERS USEFUL AS PRINTING VEHICLES

CROSS-REFERENCE TO RELATED APPLICATIONS

This application is a continuation-in-part of U.S. Ser. No. 08/359,247, filed Dec. 16, 1994 now abandoned, which is a continuation of U.S. Ser. No. 08/167,264, filed Dec. 14, 1993 now abandoned, which is a continuation-in-part of U.S. Ser. No. 08/087,823, filed Jul. 1, 1993 now abandoned, the disclosures of which are incorporated by reference herein.

FIELD OF THE INVENTION

The present invention relates to copolymers and to their use as printing vehicles. More particularly, it relates to alkyl acrylate copolymers and their use in printing inks or varnishes particularly suited for use flexographic or gravure printing processes.

BACKGROUND OF THE INVENTION

Alkyl acrylate and methacrylate polymers are generally known in the art. see e.g. "Acrylic and Methacrylic Ester Polymers", *Encyclopedia of Polymer Science and Engineering*, vol. 1, pp. 236–299 (John Wiley & Sons, Inc. N.Y., N.Y., 1985). For example, the effect of the choice of alkyl group on the chemical and mechanical properties of homopolymers of the alkyl acrylate and methacrylate monomers is discussed at pages 256–261. At page 258, the regulation of the glass transition temperature of copolymers (by controlling the weight fraction of the monomers) is discussed and it is noted that acrylates with low transition temperatures are often used as plasticizers for harder copolymerizable monomers, often methacrylates.

Acrylate and methacrylate ester polymers are known to have a wide variety of uses. The use of higher alkyl esters of acrylic acid as single-component pressure-sensitive adhesives is discussed in "Pressure-Sensitive Adhesives", *Encyclopedia of Polymer Science and Engineering*, vol. 13, pp. 353–355 (John Wiley & Sons, Inc. N.Y., N.Y., 1988). It is stated that the predominant raw materials are the butyl and 2-ethylhexyl esters of acrylic acid. One formulation for a general purpose pressure-sensitive adhesive is a copolymer of 97% by weight 2-ethylhexyl acrylate and 3% by weight of acrylic acid. Another formulation is a copolymer of 63% by weight 2-ethylhexyl acrylate and 30% by weight of vinyl acetate and 2% by weight acrylamide.

The use of acrylic ester polymers as binders is also known. For example, U.S. Pat. No. 5,196,470 (Anderson et al.) discloses an alcohol based, water soluble binder composition for nonwoven material made from water swellable, water soluble or water sensitive fibers and related substances is provided comprising a substantially anhydrous solution of an acrylic polymeric resin, and an alcohol diluent. The resin is a synthetic polymer which may be synthesized from an acrylic acid ester, methacrylic acid ester, or both, in combination with a polymerizable alpha, beta ethylenically unsaturated carboxylic acid.

U.S. Pat. No. 4,230,613 (Wolinski et al.) discloses a lacquer composition for coating a substrate, comprising acrylic polymers such as methyl methacrylate/butyl acrylate/acrylic acid terpolymers, a volatile solvent such as a mixture of toluene and isopropanol, and a tertiary amine activator.

The use of acrylate ester polymers as printing ink vehicles is generally discussed in "Printing Ink Vehicles", *Encyclopedia of Polymer Science and Engineering*, vol. 13, pp. 368–398 (John Wiley & Sons, Inc. N.Y., N.Y., 1988). For example, at page 393, it is stated that while acrylic and methacrylic ester resins are used in water-based systems, several problems still exist, for example balancing water solubility in the ink and water resistance in the end product.

U.S. Pat. No. 4,921,899 discloses an ink composition containing a blend of a polyester, an acrylic polymer and a vinyl polymer. The water-based inks containing the blend of these polymers as a binder can significantly improve ink film properties such as alcohol resistance, block resistance and water resistance as compared to use of water-dispersible polyester alone. The polymer blends were also employed to prepare ink primers and overprint varnishes. It is stated that these polymer blends were prepared by mixing an aqueous polyester dispersion with an acrylic emulsion which contains surfactants and other additives and that the presence of surfactants in the ink formulations creates several problems related to ink stability, printing process and print quality of the ink film.

U.S. Pat. No. 5,075,364 (Phan et. al.) discloses a blend of a water-dissipatable polyester material, an acrylic polymer and a water-dissipatable vinyl polymer. It is stated that the acrylic polymer and the vinyl polymer must be compatible with the polyester which has a particular composition. It is stated that the polymer blends are useful for preparing ink compositions having improved block resistance, water resistance, and alcohol resistance.

SUMMARY OF THE INVENTION

This invention relates to a polymer produced by the process of polymerizing monomers comprised of:

(i) an aromatic monomer having the formula $CH_2=C(R^1)(R^2)$ wherein $R^1$ is an aromatic group having from 6 to 10 carbon atoms, and $R^2$ is hydrogen or methyl, (ii) a long-chain aliphatic monomer having the formula $CH_2=C(C(O)OR^3)(R^4)$ wherein $R^3$ is a fatty alkyl group having from 12 to 22 carbon atoms and $R^4$ is hydrogen or methyl, and (iii) a hardening monomer having the formula $CH_2=C(C(O)OR^5)(R^6)$ wherein $R^5$ is a hardening alkyl group having from 1 to 4 carbon atoms and $R^6$ is hydrogen or methyl, wherein the amount of said long-chain aliphatic monomer is effective in relation to the other recited monomers to improve the alkali resistance of a film of said polymer. Said polymer is typically produced by polymerization of the monomers while in an aqueous emulsion comprising a polymer component consisting essentially of a low-molecular weight, water-soluble, acrylic polymer having carboxylate functionality.

In preferred embodiments, the blend of monomers consists essentially of one or more of said aromatic monomers in an amount from about 25% to about 45% by weight, one or more of said long-chain aliphatic monomers in an amount of from about 25% to about 45% by weight, and one or more of said hardening monomers in an amount of from about 25% to about 45% by weight. The polymer typically has a molecular weight (e.g. weight average) of from about 150,000 to about 300,000.

The polymers of this invention can also be represented by the formula:

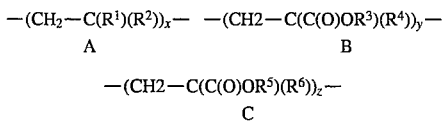

wherein $R^1$ is an aromatic group having from 6 to 10 carbon atoms, $R^3$ is a fatty alkyl group having from 12 to 22 carbon atoms, and $R^5$ is a hardening alkyl group having from 1 to 4 carbon atoms, $R^2$, $R^4$, and $R^6$ are each independently hydrogen or methyl, and y is effective in relation to x and z to improve the alkali resistance of a film of said polymer. The subscripts x, y, and z, represent the mole ratios of the monomeric units. Thus, the subscripts will be integers for a mono-disperse polymer composition and will be average values when expressed in relation to a poly-disperse polymer composition. Further, the formula is not intended to convey that the polymer is a block copolymer as it is believed, based on the reactivity ratios of the monomers, that the polymer will be a random terpolymer (or higher-polymer if polymeric units derived from additional comonomers are present).

A preferred class of polymers within the scope of this invention have the formula set forth above wherein $R^1$ is phenyl, $R^3$ is a straight chain alkyl group selected from the group consisting of tetradecyl, hexadecyl and octadecyl, $R^5$ is methyl, the ratio of x:y:z is chosen such that the polymer is comprised of monomeric units of formula A in an amount from about 25% to about 45% by weight, monomeric units of formula B in an amount from about 25% to about 45% by weight, and monomeric units of formula C in an amount from about 25% to about 45% by weight, and the sum of x, y, and z is chosen such that the polymer has a molecular weight (e.g. weight average) of from about 150,000 to about 300,000.

This invention also relates to a method of coating a substrate comprising (i) contacting a surface of a substrate with a composition comprising a polymer as defined above, and (ii) drying said surface to form a film of said polymer in contact with said surface. In preferred methods, said polymer in aqueous dispersion is supplied to said surface by a hydrophilic cylindrical transfer roll.

DETAILED DESCRIPTION OF THE INVENTION

This invention relates to novel polymers of this invention, e.g. polymers having the formula set forth above, to printing ink vehicles which contain these novel polymers, and to methods which employ these novel polymers. These polymers are at least terpolymers, i.e. they have repeating units derived from a vinyl aromatic monomer and two different alkyl acrylates. The precise identity of each monomer and the amount of each monomer affect properties of the polymer which are important to its utility in a printing ink vehicle Thus, the starting materials for preparing the novel polymers of this invention are vinyl aromatic compounds and alkyl esters of acrylic acid and methacrylic acid. Vinyl aromatic compounds are discussed in "Styrene Polymers" *Encyclopedia of Polymer Science and Engineering,* vol. 16, pp. 1–21 (John Wiley & Sons, Inc., N.Y., N.Y., 1989) and such esters are described in "Acrylic and Methacrylic Ester Polymers", *Encyclopedia of Polymer Science and Engineering,* vol. 1, pp. 234–299 (John Wiley & Sons, Inc., N.Y., N.Y., 1985), the disclosures of which are incorporated herein by reference.

The monomeric unit A is derived from a vinyl aromatic compound. The vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of meta-methylstyrene and para-methylstyrene ), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene.

The monomeric unit B is derived from acrylate or methacrylate esters of fatty alcohols which give rise to the $R^3$ in the polymer. The group $R^3$ is selected so that the unit derived from that monomer will provide alkali resistance to a film of the polymer. $R^3$ is, thus, selected from fatty alkyl groups having from 12 to 22 carbon atoms. Examples of such fatty alkyl groups include n-dodecyl (e.g. lauryl), n-tridecyl, n-tetradecyl (e.g. myristyl), n-pentadecyl, n-hexadecyl (e.g. palmityl or cetyl), n-heptadecyl (e.g. margaryl), n-octadecyl (e.g. stearyl), n-nonadecyl, n-eicosanyl (e.g. arachidyl), and docosanyl (e.g. behenyl). Preferred are the alkyl radicals having from 14 to 18 carbon atoms, most preferably straight chain alkyl radicals, and more preferably from natural sources such that the group will have an even number of carbon atoms. Thus, the group most preferred as $R^3$ is a lauryl, myristyl, palmityl or stearyl group, or monomers derived from mixtures of fatty alcohols.

It is the fatty alcohol groups of the B monomeric unit that are believed to be responsible for the enhanced alkali resistance of films of the polymer. It should be noted, however that enhanced alkali resistance is only one facet of the important properties of the polymer and that stability of the polymer emulsion in an aqueous medium is important as well.

Therefore, the amount of the B monomeric unit should be adjusted to obtain the desired degrees of both alkali resistance and emulsion stability. This amount will generally be a minor amount, e.g. from about 5% to less than about 50% by weight of the polymer, preferably greater than 23%, and more preferably from about 30% to 40%. However, the amount of the B monomeric unit should be adjusted to obtain levels of alkali resistance and emulsion stability that are optimal for a given ink composition. Thus, the precise characteristics desired of the aqueous emulsion and the polymer film prepared therefrom will influence the determination of what is an optimal amount of the B monomeric unit, as will be discussed more fully below.

The monomeric unit C is derived from acrylate or methacrylate esters of alcohols which give rise to the $R^5$ in the polymer. Examples of $R^5$ groups that should be useful include methyl, ethyl, isopropyl, isobutyl, sec-butyl, t-butyl, isoamyl, and t-amyl. The precise identity and amount of the $R^3$ monomer will depend upon the desired degree of hardness which, in turn, depends at least in part on the identity and amounts of the other monomeric units.

Both the A monomeric unit and the C monomeric unit tend to affect the hardness and emulsion stability of the polymer. Thus, $R^1$, $R^5$, x and z are selected so that the polymer will have sufficient hardness and sufficient susceptibility to emulsification in the polymer emulsion. For example, the mechanical properties contributed to the polymer by the $R^2$ through $R^4$ and $R^6$ groups may require the selection of an $R^1$ and/or $R^5$ group that has a relatively greater hardening effect (e.g. phenyl for $R^1$ and methyl or t-butyl for $R^5$) than others (e.g. ethyl or isobutyl). A measure of the hardening effect of the $R^5$ group can be found by examining the glass transition temperature of a homopolymer of the monomer. Generally, $R^5$ will be selected such that a homopolymer of the monomer will exhibit a glass transition temperature ($T_g$) of greater than about 50° C.

Further, the values of x and z (i.e. the molar amounts of the monomers which contribute these monomeric units to the polymer) should be sufficient in relation to y to yield a polymer that is sufficiently susceptible to emulsification such that a stable polymer emulsion is formed. If the polymer is not sufficiently susceptible to emulsion, observable polymer coagulum may form in the emulsion during either the polymerization or the intended shelf life of the aqueous emulsion or printing vehicle prepared therefrom.

Monomeric units derived from other alkyl acrylates or methacrylates may also be present in the polymer. Examples of such other esters that may be useful include the acrylate or methacrylate esters methyl, ethyl, n-propyl, isopropyl, n-butyl, isobutyl, sec-butyl, n-amyl, isoamyl, t-amyl, n-hexyl, 2-ethylbutyl, cyclohexyl, 2-heptyl, n-octyl, 2-ethylhexyl, n-decyl, and n-undecyl. A potential utility of such monomers is the ability of one of ordinary skill, in possession of this disclosure, to use such monomers to optimize the hardness of the polymer. Thus, one measure of their utility will depend upon the desired degree of hardness of the polymer which, in turn, depends at least in part, on the identity and amounts of the other monomeric units. A measure of the plasticizing effect of a monomer can be found by examining the glass transition temperature of a homopolymer of the monomer. Generally, a plasticizing monomer will be such that a homopolymer of the monomer will exhibit a glass transition temperature ($T_g$) of less than about −30° C. Thus, acrylates of a straight chain alkyl having from 3 to 11 carbon atoms or a branched chain alkyl having from 5 to 11 carbon atoms may generally be useful for plasticizing the polymer. Because of the relatively high $T_g$ of poly(t-butyl acrylate), the use of a monomer t-butyl acrylate is unlikely to be advantageous.

It has been found, however, that the mechanical properties contributed to the polymer by the $R^3$ group make generally unnecessary the addition of a monomer that is known to have a relatively greater plasticizing effect (e.g. 2-ethylhexyl acrylate or n-butyl acrylate) than others (e.g. methyl acrylate or isopropyl acrylate). While not wishing to be bound by any particular theory, unless otherwise expressly noted, it is thought that the amounts of the B monomeric unit that are useful for imparting alkali resistance also make the $R^3$ group exert a plasticizing effect on the polymer. Thus, there should be no need for monomeric unit derived from a conventional plasticizing monomer such as 2-ethylhexyl acrylate.

Further, while the preferred alkyl acrylates and methacrylates described above are preferably employed without additional comonomers for preparing ink vehicles of this invention, other monoethylenically unsaturated polymerizable monomers useful in minor proportion (e.g. less than 10% by weight of the total monomer composition) as comonomers with acrylic monomers may be useful in preparing the polymers of this invention, particularly for uses other than in ink vehicles. These monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like.

Additional monoethylenically unsaturated polymerizable comonomers that may be useful in preparing the polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the polymer.

Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof. In addition to monoethylenically unsaturated monomer, small proportions of ethylenically monomer having at least two sites of ethylenic unsaturation, that is, di- or multi-ethylenically unsaturated monomer, may be useful as a comonomer in preparing the polymer. For example, allyl methacrylate or divinyl benzene may be used. The initial latex polymer may be prepared from a monomer mixture containing from about 0.005 to 2 percent by weight, based on the weight of the total solids of the polymer, of monomer containing at least two sites of ethylenic unsaturation. However, it is preferred to employ no multi-ethylenically unsaturated monomer.

In one embodiment, it is preferred that the polymer be prepared by emulsion polymerization of monomers comprising:

(a) a first minor amount by weight (e.g. from about 25% to 45% by weight, based on the total weight of the polymer) of vinyl aromatic monomer having less than twelve carbon atoms, and mixtures thereof, (b) a second minor amount by weight (e.g. from about 25% to 45% percent by weight, based on the total weight of the polymer) of the ($C_{12}$–$C_{20}$) alkyl esters of acrylic acid or methacrylic acid, and (c) a third minor amount by weight (e.g. from about 25% to 45% percent by weight, based on the total weight of the polymer) of the $C_1$–$C_4$ alkyl esters of acrylic acid or methacrylic acid.

The preparation of aqueous dispersions of polymers by emulsion polymerization for use in coatings applications is well known in the art. The practice of emulsion polymerization is discussed in detail in G. Poehlein, "Emulsion Polymerization", *Encyclopedia of Polymer Science and Technology*, vol. 6, pp. 1–51 (John Wiley & Sons, Inc. N.Y., N.Y., 1986), the disclosure of which is incorporated herein by reference. Conventional emulsion polymerization techniques may be used to prepare the aqueous dispersion of polymers of this invention.

Thus, monomers may be emulsified with an anionic, cationic or nonionic dispersing agent, using for example from about 0.05% to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid. Cationic dispersion agents include lauryl-pyridinium chlorides, cetyldimethyl amine acetate, and alkyldimethylbenzylammonium chlorides in which the alkyl group has from 8 to 18 carbon atoms. Anionic dispersing agents include, for example, the higher fatty alcohol sulfates, such as sodium lauryl sulfate, and the like; alkylaryl sulfonates such as sodium or potassium isopropylbenzene sulfonates or isopropyl naphthalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxyethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

In addition to the emulsifiers set forth above, the emulsion may contain one or more suspending aids. Preferred compositions contain an acrylic resin having a substantial acid number as a suspending aid. (By "substantial" is meant an acid number sufficient to impart the desired degree of resolubility to the polymers in the ink or varnish, as discussed below.) Such resins become and contribute to the polymer film prepared from the emulsion, but do not have acceptable properties, e.g. alkali resistance, by themselves. Such suspending aid resins do, however, affect the resolubility of the polymer blend in the ink vehicle. By "resolubility" is meant that the polymer will redisperse in the ink vehicle while still in a wet state so that there will not be an unacceptable build up of the polymer on a transfer roll used to apply the polymer to a substrate.

For example, in an ink composition or with a printing apparatus that is relatively more susceptible to deposition of polymer on the transfer rolls, it may be desirable to employ a suspending aid polymer with a relatively higher acid number. Use of such a polymer will tend to decrease the alkali resistance of a film of the polymer, but should improve the resolubility of the polymer in the ink or varnish and, thus, tend to prevent deposition of the polymer on a transfer roll used to apply the ink or varnish to a printing substrate. Conversely, if resolubility is not as important a factor for a given ink composition or varnish, or for a given printing apparatus, it may be desirable to minimize the acid number of the suspending aid resin and, thus, obtain superior alkali resistance.

Preferred carboxylate polymers are vinyl aromatic/acrylic copolymers (e.g. styrene/acrylic copolymers) having a substantial acid number (typically 150–250, and preferably 180–220) and a moderate molecular weight (e.g. 6,000 to 10,000). Vinyl aromatic compounds are discussed in "Styrene Polymers" *Encyclopedia of Polymer Science and Engineering*, vol. 16, pp. 1–21 (John Wiley & Sons, Inc., N.Y., N.Y., 1989), the disclosure of which is incorporated herein by reference. The vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene. At least a portion of the acrylic units of the polymer will bear free carboxyl or carboxylate groups (the carboxyl or carboxylate form depending upon the pH of the aqueous emulsion). This carboxylate functionality is solvated by the aqueous polymerization medium and, thus, contributes to the stability of the polymer suspension. The aqueous composition should be essentially free of species which can react with or form a complex with such carboxylate functionality. Such freedom will ensure that the carboxylate functionality remains solvated by the aqueous polymerization medium and/or that the carboxylate polymer will not engage in measurable crosslinking, either in the aqueous polymerization medium or the films prepared therewith. Also, emulsion stabilizers, i.e. water-soluble polymers such as water-soluble polyalkylene oxides, may be useful. A preferred emulsion stabilizer is a polypropylene glycol having a molecular weight (e.g. weight average) in the range of 1,000 to 1,500.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or more, and may be optimized for the catalyst system employed, as is conventional. Emulsion polymerization may be seeded or unseeded. Seeded polymerization is preferred and tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased (e.g. with t-butyl hydroperoxide and or sodium ascorbate) to minimize the concentrations of unreacted monomer and unreacted polymerization catalyst species. The pH of the contents of the reaction vessel may also be altered during the course of the emulsion polymerization process. Both thermal and redox polymerization processes may be employed.

The subject matter of this application is similar to the subject matter of U.S. application Serial Number (Case No. M5452 FPD/COIN), entitled "Polymers Useful as Printing Vehicles", filed on even date herewith in the names of Brenda Cleary and Steven Boucher, the disclosure of which is incorporated by reference herein.

While the preferred use of the preferred polymers of this invention is in a printing ink vehicle, e.g. as a binder resin or a varnish, the polymer can be used in a wide variety of end-use applications. For example, it can be used in leather finishes and coatings, clear and pigmented coatings for wood and other architectural substrates, caulks, and sealants and as a binder for an exterior coating composition, such as those used to protect sprayed-in-place polyurethane foam roofing (roof mastics).

Because of the excellent film-forming capabilities of the polymer, the polymer can be used in coating in general. The aqueous dispersions of the present invention can, thus, be applied to a variety of substrates to form a coating thereon. These substrates include, for example, porous stock such as paper and cardboard, wood and wood products, metals such as aluminum, copper, steel, and plastics e.g. films such as polyolefins (low density polyethylene, linear low density polyethylene, polypropylene), polyesters, (e.g. polyethylene terephthalate), polyamides, polycarbonates, acrylics and the like. The compositions are applied by methods such as spraying, rollcoating, flexo and gravure processes onto a selected substrate. The resulting coated substrate is typically allowed to dry before further processing.

The coating compositions may optionally include other substances such as pigments, resins, monomers and additives such as anti-oxidants and rheological modifiers. Methods of coating and materials used in coatings are described in *Encyclopedia of Polymer Science and Engineering*, vol. 3, pp. 552–671 and supp. vol., pp. 53, 109 and 110 (John Wiley & Sons, Inc., N.Y., N.Y., 1985), the disclosure of which is incorporated by reference.

The ink and varnish compositions of this invention can be for any of the typical ink or varnish applications such as flexographic, gravure, letterpress, ink-jet, or screen-process printing applications. The ink compositions of the present invention have excellent adhesion to a wide variety of substrates including plastic films such as polyester, polyethylene or polypropylene, aluminum foil, glass, and paper. The ink and varnish compositions of the present invention should have a pH greater than 8, e.g. typically 8.2 to 9.0.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows. The colorant is added to the polymer blend dispersion and, at a properly adjusted viscosity, dispersed thereinto with ball mill, sand mill, high-shear fluid flow mill, Cowles Dissolver, Katy Mill or the like. The colorants also may be dispersed directly in the polymer by milling on a heated two-roll mill at about 220° F. to 360° F. (104.44° C. to 182.22° C.) and using processing aids as desired, such as solvents or plasticizers. The viscosity and printing characteristics of the ink composition may be modified further by addition of water, solvents, plasticizers, sequestered wax, surfactants and the like to suit the particular printing needs.

The ink compositions of the present invention are not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

The aqueous emulsions of this invention are particularly useful in preparing inks or varnishes that are, in turn, particularly useful in the printing of packaging substrates, e.g. non-woven cellulosic substrates. Such non-woven cellulosic substrates are sheets or other continuous webs of cellulosic fibers formed by deposition of the fibers from a suspension in such a way that the fibers are intermeshed to form a thin but compact whole. Thus, these substrates can be characterized as paper. Examples of paper stocks include letter stock, bag stock, carton stock, newsprint, and so on. The inks and varnishes of this invention are particularly useful in printing packaging papers, such as bag stock and carton stock.

The printing processes most advantageously used with the inks or varnishes are the flexographic and/or gravure printing processes. One characteristic of such printing processes, is that the aqueous dispersion of ink or varnish is supplied to said surface by a hydrophilic cylindrical transfer roll. Printing processes are described by T. Sulzberg et al., "Printing Ink Vehicles", *Encyclopedia of Polymer Science and Engineering*, vol. 13, pp. 368–398 (John Wiley & Sons, Inc., N.Y, N.Y., 1988), the disclosure of which is incorporated herein by reference. Thus, this invention relates to a method of printing comprising applying a first portion of an aqueous dispersion comprised of the polymer of this invention to a first essentially impervious printing surface, said surface having recesses therein which define a resolvable image, contacting said surface with a printable substrate, and repeating said applying and said contacting with a second portion of said aqueous dispersion and a second printable surface. This method may be a letterpress printing method (wherein said recesses define raised portions of the surface which carry the aqueous dispersion to the substrate, e.g. flexography) or a gravure printing method (wherein said recesses carry the aqueous dispersion to the substrate). In flexographic printing in particular, an aqueous dispersion comprised of the polymer of this invention is applied to a flexible plate mounted on a plate cylinder. The flexible plate is then contacted with a printable substrate by rotation of the plate cylinder. In preferred embodiments, the aqueous dispersion is applied to the flexible plate with a hydrophilic cylindrical transfer roll which is rotated to successively take up and then apply successive portions of the aqueous dispersion. The use of the polymer of this invention allows one of ordinary skill in the art to print an alkali resistant film, but without retention of solid residues of polymer on the printing surface or the transfer surface.

In accordance with the present invention, ink or varnish compositions prepared from the above polymer blends may be superior over prior aqueous ink or varnish compositions in one or more of such properties as pigment wetting, pigment stability, temperature stability (heat and freeze-thaw), nonsettling for extended periods of time, nonpolluting with respect to odor and volatile organics, nonflocculating, long "open" time in the press fountain, wide viscosity range inks, adhesion to a variety of substrates, hardness, gloss, drying rate on substrates, film-forming properties at low temperatures without organic co-solvents, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy cleanup, nonplugging of printing plates, flexibility, redispersibility or rewetting, crinkle resistance, solvent resistance, alkali, chemical and detergent resistance, blocking resistance, light-fastness, heat resistance, slip angle, coefficient of friction, toughness, substrate wetting, hold-out, opacity, dry-rate, and no offset on the printing press (coating e.g. on tension rollers).

The following examples will serve to further illustrate the invention, but should not be construed to limit the invention, unless expressly set forth in the appended claims. All pads, percentages, and ratios are by weight unless otherwise indicated in context.

EXAMPLES

Polymer Preparation

All of the resins set forth below were prepared by the following general procedure. The starting materials were premixed as six separate changes in the amounts set forth below.

| | Parts by weight |
|---|---|
| CHARGE 1 | |
| Suspending aid resin (styrenated acrylic resin at 30 wt. % solids in water, acid value: 180–220, M.W.: 6,000–10,000) | 31.68 |
| Deionized Water | 28.40 |
| Dowfax 2A1 surfactant | 0.20 |
| Triton X-100 surfactant | 0.80 |
| CHARGE 2 | |
| Ammonium Persulfate initiator | 0.30 |
| Deionized Water | 1.50 |
| CHARGE 3 | |
| Monomers | 35.00 |
| CHARGE 5 - chaser | |
| Tert-Butylhydroperoxide | 0.23 |
| Sodium Ascorbate | 0.11 |
| Deionized Water | 0.40 |
| CHARGE 6 | |
| Polyethylene glycol (1200 M.W.) | 1.28 |
| Biocide (Tektamer 38AD, Calgon Corp.) | 0.10 |
| Total | 100.00 |

The polymers were then prepared by the following steps. Blanket the reactor with nitrogen and add Charge 1. Heat Charge 1 in the reactor to 85° C. Pump 10% of Charge 3 from monomer tank into the reactor. Add Charge 2 to the reactor and continue mixing. Meter the remaining Charge 3 from the monomer tank into the reactor over a 105 minute period at 83° C. and mix for 1 hour. Add Charge 5 to the reactor and mix for 1 hour at 84° C. Cool to 49° C. Pump Charge 6 into reactor over 60 minutes and mix for 15 minutes.

Varnish Preparation

All of the polymers were used to prepare a varnish by simple mixing of 91 parts by weight of the product of the polymerization with a 9 parts by weight of a coalescent agent, ethylene glycol propyl ether.

Coating Procedures and Tests

The varnishes were diluted with water to a composition having a viscosity of 21 to 23 seconds on a #2 Zahn cup and the diluted composition was printed with a #8 wound wire rod on an uncoated Leneta chart. The coatings were then allowed to dry overnight.

The coatings were tested for alkali resistance with an alkali drop test. A drop of each of four different alkaline solutions (1.5% ammonium hydroxide, 2% sodium hydroxide, 30% Dairy Pak Line Lube (pH 11–12), and 100% Formula 409 brand cleaner) was placed in three separate locations on the varnish (12 drops total distributed over the surface of the varnish). Individual drops of each of the four solutions were then blotted up, one for each solution after 5 minutes, one for each solution after 10 minutes, and one for each solution after 30 minutes (the 30 minute ammonium hydroxide samples were replenished at 15 minutes and blotted at 30 minutes). The areas under the spots were then analyzed for any effects, including dissolving, opacifying, film puckering or buckling, and so on. Each area was then assigned a rating of zero to 10, zero meaning complete removal of the varnish and 10 meaning no observable effect. All ratings were then averaged (mean) to yield an average rating as a composite of all four alkaline solutions at all of the times. It is believed that resistance ratings have a margin of error of ±4%. The coatings were evaluated for gloss by conventional means, i.e. simply measuring the percent of visible light reflected from the surface at the same angle as the incident angle of the light. The values expressed below are the percent of light reflected.

Example 1–4 and Comparative Example A

Polymers were prepared by the procedure set forth above using a monomer blend of styrene (STY), methyl methacrylate (MMA), 2-ethylhexyl acrylate (EHA) and hexadecyl acrylate (HDA) in the amounts (in parts by weight) shown in Table 1A. Each polymer was made into a varnish, printed, and the printed film was evaluated for alkali resistance and gloss, all as set forth above. The results are shown in Table 1B, wherein the "Δ%" value under alkali resistance is the percent difference in the alkali rating from the value of Comparative Example A.

TABLE 1A

| Example | STY (pbw) | MMA (pbw) | EHA (pbw) | HDA (pbw) |
|---|---|---|---|---|
| A | 15 | 12 | 8 | 0 |
| 1 | 15 | 12 | 4 | 4 |
| 2 | 15 | 12 | 2 | 6 |
| 3 | 15 | 12 | 0 | 8 |
| 4 | 12.5 | 10.5 | 0 | 12 |

TABLE 1B

| | Alkali Resistance | | Gloss |
|---|---|---|---|
| Example | Rating | Δ % | (%) |
| A | 5.9 | — | 70.0 |
| 1 | 6.3 | +6 | 70.5 |
| 2 | 6.3 | +6 | 70.7 |
| 3 | 6.1 | +4 | 65.8 |
| 4 | 8.4 | +42 | 72.0 |

Example 5

A polymer was prepared by the procedure set forth above from 15 parts by weight of styrene, 12 pads by weight of methyl methacrylate, 4 parts by weight of 2-ethylhexyl acrylate, and 4 parts by weight of dodecyl acrylate. The polymer was made into a varnish, printed, and the printed film was evaluated, all as set forth above. The alkali resistance rating was 5.7, difference of –4 % from Comparative Example A, and the gloss was 69.4%.

Examples 6–9

Polymers were prepared from the same materials as Examples 1-4, except that docosanyl acrylate ($R^3$ is a 22 carbon alkyl group) was substituted for the hexadecyl acrylate on a weight-for-weight basis. The results of an evaluation, performed as set forth above, of printed coatings prepared from these polymers, in accordance with the procedures set forth above, are shown in Table 2, wherein the "Δ%" value under alkali resistance is the percent difference in the alkali rating from the value of Comparative Example A.

TABLE 2

| | Alkali Resistance & Gloss for Examples 6–9 | | |
|---|---|---|---|
| | Alkali Resistance | | Gloss |
| Example | Rating | Δ % | (%) |
| A | 5.9 | — | 70.0 |
| 6 | 6.1 | +3 | 68.0 |
| 7 | 5.7 | –4 | 68.7 |
| 8 | 6.5 | +10 | 65.3 |
| 9 | 6.2 | +5 | 63.8 |

Examples 10–14

Polymers were prepared as set forth for Example 1, but a suspending aid resin having less free acid groups (i.e. one less susceptible to being redissolved in a printing ink or varnish) was used. The suspending aid resin had the percentage reduction by weight of free acid groups shown in Table 3 and printed films thereof exhibited the alkali resistance and gloss shown in Table 3, wherein the "Δ%" value under alkali resistance is the percent difference in the alkali rating from the value of Example 1. It should be noted that only the varnish of Example 10 showed acceptable resolubility (in a simple test of coating a substrate with the diluted varnish, allowing the coating to dry, then recoating with the another sample of the same diluted varnish, and observing the amount of the original coating redissolved), but also showed no improvement in alkali resistance.

TABLE 3

| | Alkali Resistance & Gloss for Examples 10–14 | | |
|---|---|---|---|
| | Decrease in Free Acid Groups | Alkali Resistance | | Gloss |
| Example | (wt %) | Rating | Δ % | (%) |
| 1 | 0 | 8.4 | — | 72.0 |
| 10 | 20 | 8.2 | –3 | 72.0 |
| 11 | 25 | 9.3 | +11 | 71.7 |
| 12 | 30 | 9.6 | +14 | 71.4 |
| 13 | 35 | 9.8 | +17 | 74.2 |
| 14 | 40 | 9.8 | +17 | 69.6 |

What is claimed is:
1. A polymer having the formula:

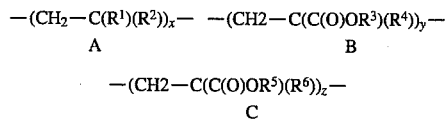

wherein $R^1$ is an aromatic group having from 6 to 10 carbon atoms, $R^3$ is a fatty alkyl group having from 12 to 22 carbon atoms, and $R^5$ is a hardening alkyl group having from 1 to 4 carbon atoms, $R^2$, $R^4$, and $R^6$ are each independently hydrogen or methyl, and y is chosen in relation to x and z such that a film of said polymer has improved alkali resistance over polymers wherein y is 0 wherein the amount of A groups is from 25 to 45% by weight, the amount of B groups is from 23% to 50% by weight and the amount of C groups is from 25% to 45% by weight based on the weight of the polymer.

2. The polymer of claim 1 wherein $R^3$ is selected from the group of fatty alkyl groups having from 14 to 20 carbon atoms, and mixtures of two or more thereof.

3. The polymer of claim 1 wherein $R^3$ is a member selected from the group consisting of tetradecyl, hexadecyl and octadecyl, and mixtures comprised predominantly of one or more of said members.

4. The polymer of claim 1 wherein $R^3$ is predominantly a hexadecyl group.

5. The polymer of claim 1 wherein $R^1$ is selected from the group of phenyl and $C_1$–$C_4$ alkyl-substituted phenyl.

6. The polymer of claim 1 wherein $R^1$ is phenyl and $R^2$ is hydrogen.

7. The polymer of claim 1 wherein $R^5$ is methyl or t-butyl.

8. The polymer of claim 1 wherein both $R^5$ and $R^6$ are both methyl.

9. A polymer of claim 1 wherein the ratio of x:y:z is chosen such that the polymer is comprised of monomeric units of formula A in an amount from about 25% to about 45% by weight, monomeric units of formula B in an amount from about 25% to about 45% by weight, and monomeric units of formula C in an amount from about 25% to about 45% by weight.

10. A polymer of claim 1 wherein the sum of x, y, and z is chosen such that the polymer has a weight average molecular weight of from about 150,000 to about 300,000.

11. A polymer of claim 1 wherein $R^1$ is phenyl, $R^5$ is methyl, the ratio of x:y:z is chosen such that the polymer is comprised of monomeric units of formula A in an amount from about 25% to about 45% by weight, monomeric units of formula B in an amount from about 25% to about 45% by weight, and monomeric units of formula C in an amount from about 25% to about 45% by weight and the sum of x, y, and z is chosen such that the polymer has a weight average molecular weight of from about 150,000 to about 300,000.

12. A polymer of claim 11 wherein $R^3$ is selected from the group of fatty alkyl groups having from 14 to 20 carbon atoms, and mixtures of two or more thereof.

13. A polymer of claim 11 wherein $R^3$ is a straight chain alkyl group selected from the group consisting of tetradecyl, hexadecyl, octadecyl, and mixtures comprised predominantly of one or more of said members.

14. A polymer produced by the process of polymerizing monomers comprised of:

(i) 25% to 45% by weight of an aromatic monomer having the formula $CH_2=C(R^1)(R^2)$ wherein $R^3$ is an aromatic group having from 6 to 10 carbon atoms, and $R^2$ is hydrogen or methyl, (ii) 23% to 50% by weight of a long-chain aliphatic monomer having the formula $CH_2=C(C(O)OR^3)(R^4)$ wherein $R^3$ is a fatty alkyl group having from 12 to 22 carbon atoms and $R^4$ is hydrogen or methyl, and (iii) 25% to 45% by weight of a hardening monomer having the formula $CH_2=C(C(O)OR^5)(R^6)$ wherein $R^5$ is a hardening alkyl group having from 1 to 4 carbon atoms and $R^6$ is hydrogen or methyl, wherein the amount of said long-chain aliphatic monomer is effective in relation to the other recited monomers to improve the alkali resistance of a film of said polymer over polymers in which the long-chain aliphatic monomers are not used in their preparation.

15. The polymer of claim 14 wherein $R^3$ is selected from the group of fatty alkyl groups having from 14 to 20 carbon atoms, and mixtures of two or more thereof.

16. The polymer of claim 14 wherein $R^3$ is a member selected from the group consisting of tetradecyl, hexadecyl and octadecyl, and mixtures comprised predominantly of one or more of said members.

17. The polymer of claim 14 wherein $R^3$ is predominantly a hexadecyl group.

18. The polymer of claim 14 wherein $R^3$ is selected from the group of phenyl and $C_1$–$C_4$ alkyl-substituted phenyl.

19. The polymer of claim 14 wherein $R^1$ is phenyl and $R^2$ is hydrogen.

20. The polymer of claim 14 wherein $R^5$ is methyl or t-butyl.

21. The polymer of claim 14 wherein both $R^5$ and $R^6$ are both methyl.

22. The polymer of claim 14 wherein said polymer is comprised of said aromatic monomer in an amount from about 25% to about 45% by weight, said long-chain aliphatic monomer in an amount from about 25% to about 45% by weight, and said hardening monomer in an amount from about 25% to about 45% by weight.

23. The polymer of claim 14 wherein said polymer has a weight average molecular weight of from about 150,000 to about 300,000.

24. The polymer of claim 14 wherein $R^1$ is phenyl, $R^5$ is methyl, said polymer is comprised of said aromatic monomer in an amount from about 25% to about 45% by weight, said long-chain aliphatic monomer in an amount from about 25% to about 45% by weight, and said hardening monomer in an amount from about 25% to about 45% by weight, and said polymer has a weight average molecular weight of from about 150,000 to about 300,000.

25. The polymer of claim 24 wherein $R^3$ is selected from the group of fatty alkyl groups having from 14 to 20 carbon atoms, and mixtures of two or more thereof.

26. The polymer of claim 24 wherein $R^3$ is a straight chain alkyl group selected from the group consisting of tetradecyl, hexadecyl, octadecyl, and mixtures comprised predominantly of one or more of said members.

27. An aqueous emulsion comprising a polymer of claim 1 dispersed in an aqueous phase.

* * * * *